(12) United States Patent
Knudson et al.

(10) Patent No.: US 10,943,601 B2
(45) Date of Patent: Mar. 9, 2021

(54) PROVIDE OUTPUT ASSOCIATED WITH A DIALECT

(71) Applicant: Lenovo (Singapore) Pte. Ltd., Singapore (SG)

(72) Inventors: Ryan Charles Knudson, Durham, NC (US); Roderick Echols, Chapel Hill, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/609,208

(22) Filed: May 31, 2017

(65) Prior Publication Data

US 2018/0350343 A1 Dec. 6, 2018

(51) Int. Cl.
*G10L 25/51* (2013.01)
*G10L 15/00* (2013.01)
*G10L 25/27* (2013.01)
*G10L 15/18* (2013.01)

(52) U.S. Cl.
CPC ............ *G10L 25/51* (2013.01); *G10L 15/005* (2013.01); *G10L 15/1807* (2013.01); *G10L 25/27* (2013.01)

(58) Field of Classification Search
CPC ....... G10L 13/033; G10L 25/27; G10L 25/75; G10L 15/005; G10L 13/047
USPC .................. 704/261, 262, 263, 266
See application file for complete search history.

(56) References Cited

U.S. PATENT DOCUMENTS

| | | |
|---|---|---|
| 7,050,976 B1 | 5/2006 | Packingham |
| 2013/0030789 A1* | 1/2013 | Dalce ................... G06F 17/289 704/2 |
| 2014/0129218 A1 | 5/2014 | Liu et al. |
| 2014/0280295 A1* | 9/2014 | Kurochkin .......... G06F 16/3337 707/769 |
| 2016/0224540 A1* | 8/2016 | Stewart ................ G06F 40/274 |
| 2016/0358609 A1* | 12/2016 | Connell, II ........... G10L 15/075 |
| 2017/0364508 A1* | 12/2017 | Abrahams ............ G06F 17/289 |

FOREIGN PATENT DOCUMENTS

| | | |
|---|---|---|
| GB | 2501067 A | 10/2013 |
| JP | H11175082 A | 7/1997 |
| WO | 2018174968 A1 | 9/2018 |

* cited by examiner

*Primary Examiner* — Thierry L Pham
(74) *Attorney, Agent, or Firm* — Ference & Associates LLC

(57) ABSTRACT

One embodiment provides a method, including: receiving, at an information handling device, audible user input; determining, using a processor, a dialect associated with the audible user input; and providing, based on the determining, output associated with the dialect. Other aspects are described and claimed.

19 Claims, 3 Drawing Sheets

PROVIDE OUTPUT ASSOCIATED WITH A DIALECT

BACKGROUND

Information handling devices ("devices"), for example smart phones, tablet devices, smart speakers, laptop and personal computers, and the like, may be capable of receiving command or query inputs and providing outputs responsive to the inputs. A common method of providing input to a device is by providing voice input to the device (e.g., to a voice input module embodied in a personal assistant, etc.). Subsequent to processing the voice input, a device may thereafter provide responsive output (e.g., audible output provided through one or more speakers, etc.). Generally, users may choose from a limited number of voice types to set as the output, for example, different languages (e.g., Chinese, Spanish, English, etc.), different countries associated with the same or similar language (e.g., British English, American English, etc.), and the like.

BRIEF SUMMARY

In summary, one aspect provides a method, comprising: receiving, at an information handling device, audible user input; determining, using a processor, a dialect associated with the audible user input; and providing, based on the determining, output associated with the dialect.

Another aspect provides an information handling device, comprising: a processor; a memory device that stores instructions executable by the processor to: receive audible user input; determine a dialect associated with the audible user input; and provide, based on the determining, output associated with the dialect.

The further aspect provides a product, comprising: a storage device that stores code, the code being executable by a processor and comprising: code that receives audible user input; code that determines a dialect associated with the audible user input; and code that provides, based on the code that determines, output associated with the dialect.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
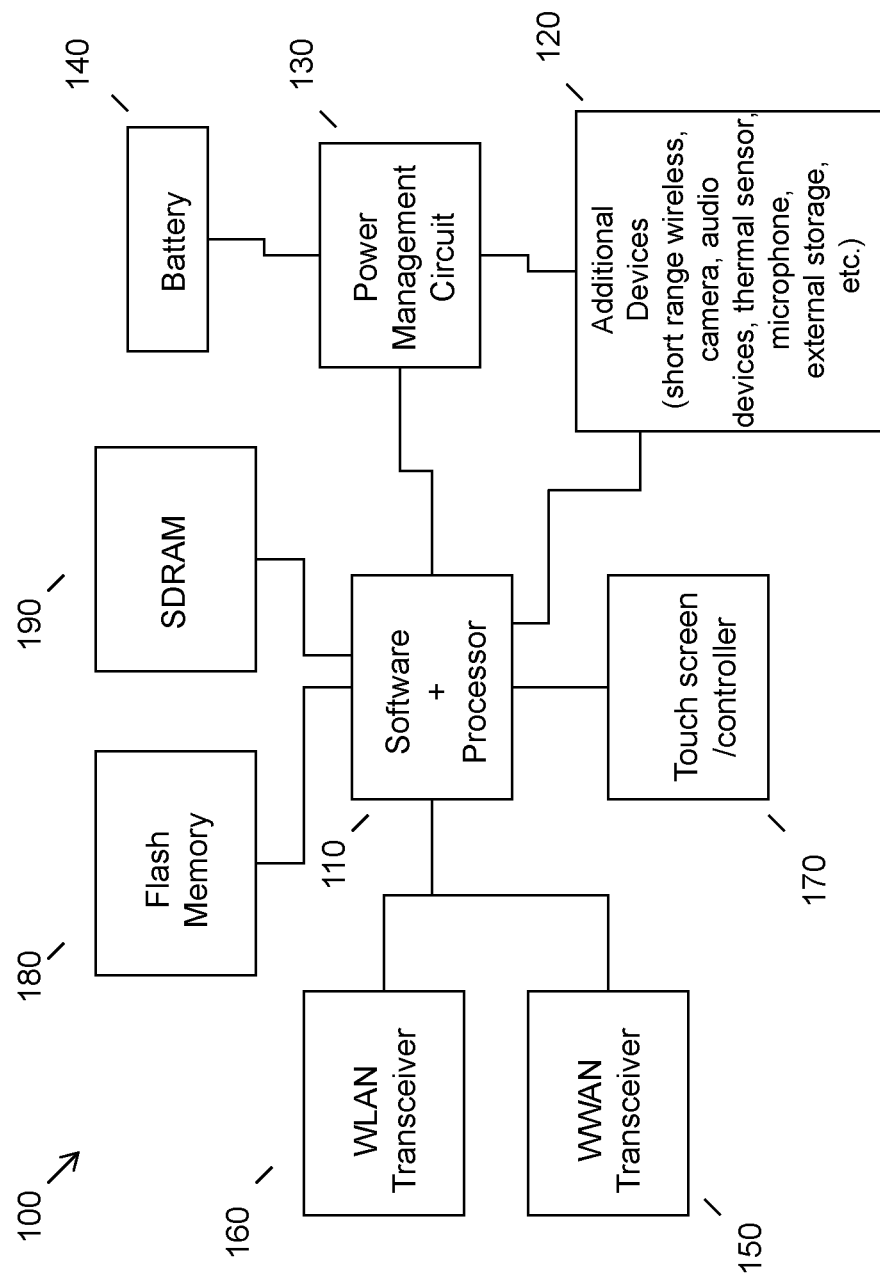
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Research has shown that people feel more comfortable and exhibit a greater sense of trust when interacting with other people that share the same regional dialect. For example, a person from a southwestern state (e.g. Texas, etc.) may feel more comfortable interacting with another individual from the same southwestern state rather than a person from a northeastern state (e.g., Massachusetts, etc.). To further emphasize this point, advertisers often utilize dialect mimicking approaches (i.e., the presentation of content in a dialect of the particular consumer) when attempting to sell products to a consumer base located in a specific geographical area.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, text inputs, gesture inputs, etc.). Conventionally, a user may select from N-number of pre-determined dialects (e.g., associated with major dialect areas, etc.) to apply to output provided by the digital assistant. For example, a user may choose to receive output in Northern American English, Southern American English, Midland American English, etc.

However, currently existing selectable dialects only comprise broad generalizations of major dialect areas and do not allow for output to be provided in smaller, regional dialects (e.g., Northeastern New England "Boston" English, Western Pennsylvanian "Pittsburgh" English, Southwestern "Texan" English, etc.). Therefore, the chance that a user's particular regional dialect is available to select is very small. This presents issues because a multitude of distinct, regional dialects may be present in a single major dialect area, or even in an individual state. Taking the state of Pennsylvania for example, the common salutation "how are you doing?" may be uttered differently depending on the region of Pennsylvania (e.g., Western Pennsylvania, Eastern Pennsylvania, etc.) the salutation was communicated. For example, if uttered in Pittsburgh, the salutation may be, "how yinz doing?", whereas if the salutation was uttered in Philadelphia, the salutation may be, "how ya doin'?" In addition to the utilization of words specific to the regional dialect, the pronunciation of certain words may differ between regional dialects as well. Therefore, a generalized output setting simply associated with a "Pennsylvania dialect" may not appropriately correspond to all of the regional dialects found in Pennsylvania. As a result, a Pennsylvania-based user who has selected a generalized Pennsylvania dialect setting still may not feel as comfortable interacting with the device as they might with another individual in their region.

Accordingly, an embodiment provides a method for providing output in a dialect associated with the determined dialect of the audible user input. In an embodiment, voice input (e.g., voice command input, voice query input, conversation input, etc.) may be received at a device. An embodiment may then determine (e.g., by identifying characteristics associated with the audible user input, etc.) a dialect the user input was provided in. Responsive to this determination, an embodiment may process the voice input and/or provide output (e.g., audible output, text based output, etc.) associated with the dialect the input was provided in. Additionally, the system may learn the dialect from the user and then provide output in that learned dialect. Thus, the system does not have to be preprogrammed with the user's dialect. Rather, the user can "train" the system merely by speaking to the system. Such a method may enable users to receive output in a dialect that they are familiar with and may therefore be more comfortable interacting with the digital assistant.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
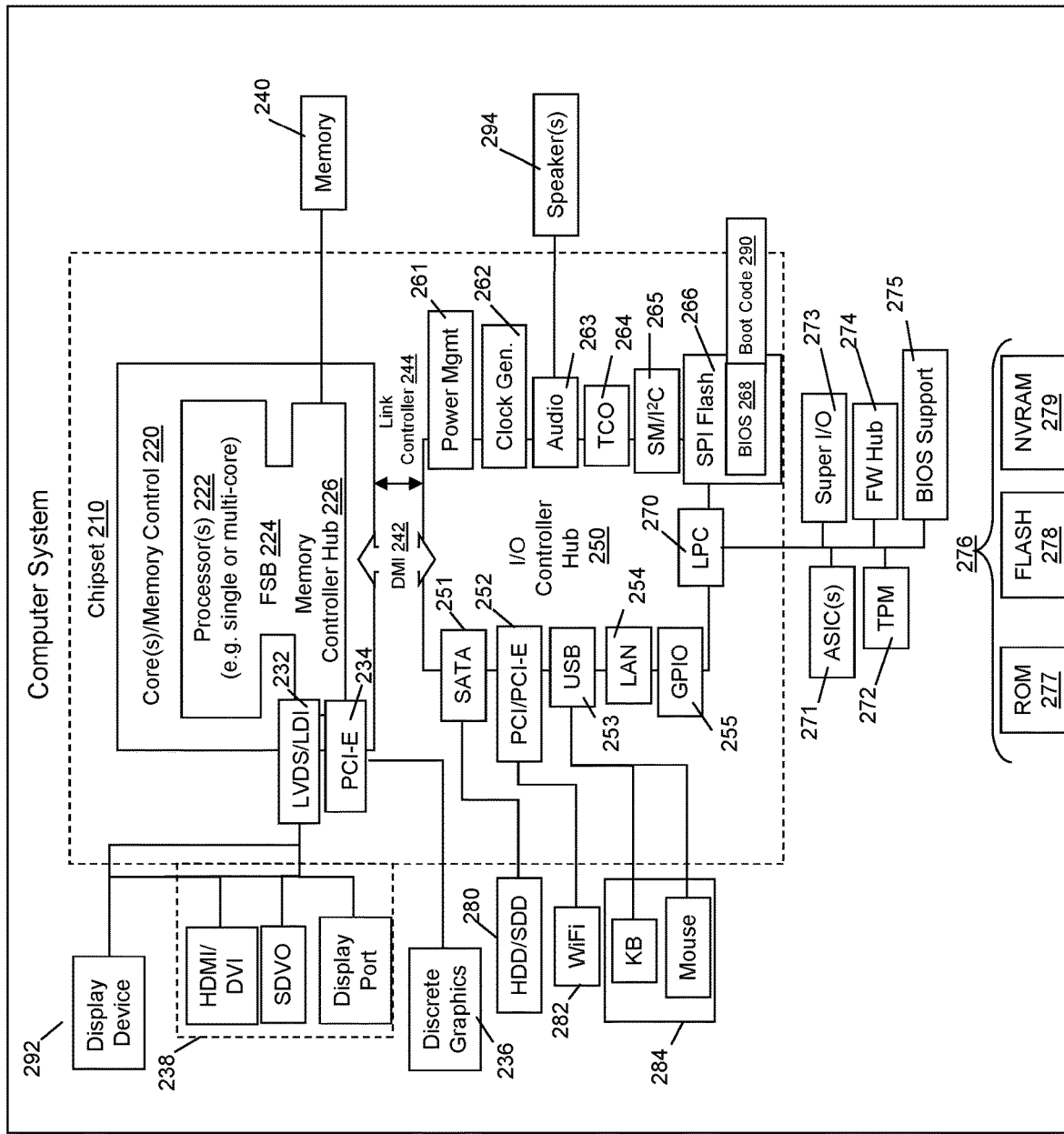
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
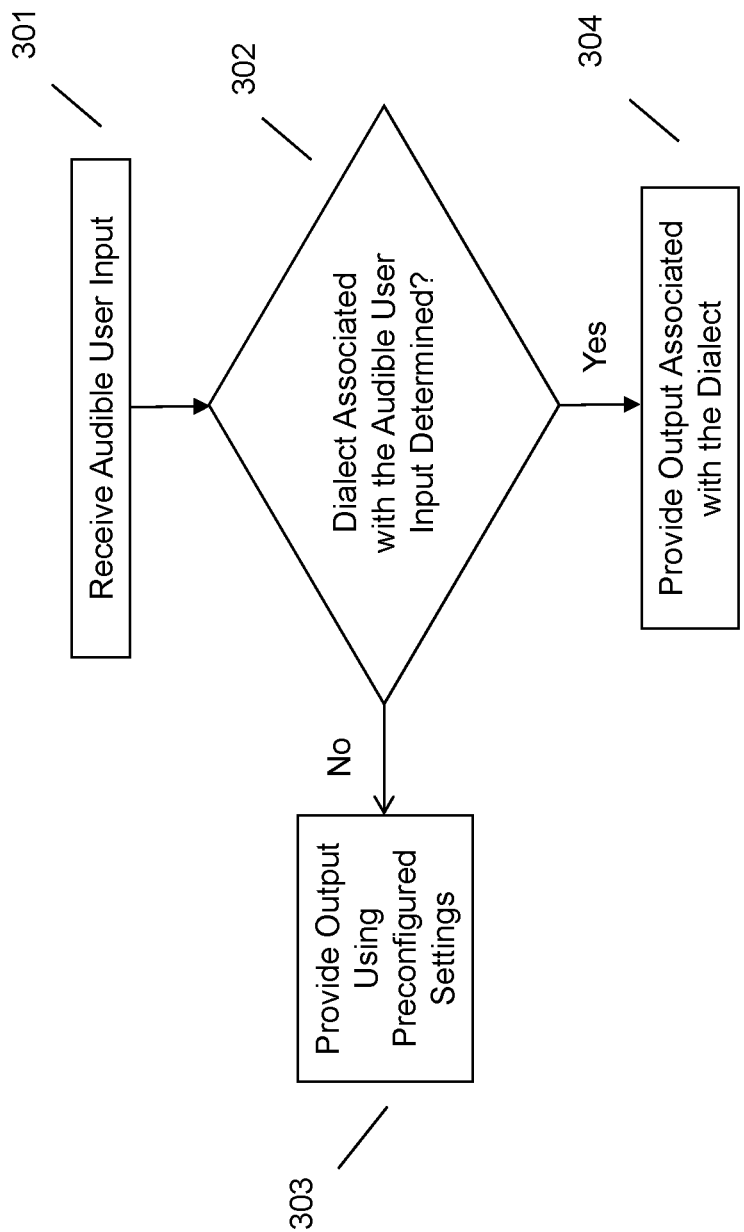
FIG. 3 illustrates an example method of providing output associated with a dialect of received audible user input.

Referring now to FIG. 3, an embodiment may provide output in a dialect associated with the dialect of the audible user input. At 301, an embodiment may receive voice input from at least one user. The voice input may be any type of input such as a command input, query input, and the like. In an embodiment, the voice input may be received at an input device (e.g., a microphone, a speech capture device, etc.) operatively coupled to a speech recognition device.

In an embodiment, the input device may be an input device integral to the speech recognition device. For example, a smart phone may be disposed with a microphone capable of receiving voice input data. Alternatively, the input device may be disposed on another device and may transmit received voice input data to the speech recognition device. For example, voice input may be received at a smart speaker that may subsequently transmit the voice data to another device (e.g., to a user's smartphone for processing, etc.). Voice input data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speech recognition device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may determine a dialect associated with the audible user input. In an embodiment, the determination may made by analyzing the voice data associated with the audible user input to identify characteristics associated with a dialect. Through the analysis, an embodiment may be able to identify a particular regional dialect and/or learn a dialect that is particular to the user providing the input. In an embodiment, the analysis may be conducted, for example, using known voice input analysis techniques (e.g., spectrogram analysis, cadence analysis, rate of speech analysis, vocabulary term analysis, word identification and/or association, etc.). In an embodiment, the analysis may be conducted in real-time or substantially real-time (e.g., as a user is providing the voice input, etc.).

In an embodiment, a characteristic associated with the audible voice input may be any characteristic that is particular to a specific regional dialect. In an embodiment, a characteristic associated with the voice data may comprise the vowel and/or consonant pronunciation of different words or phrases. For example, some speakers may draw out particular vowel or consonant sounds, while other speakers may clip or omit some vowel or consonant sounds. Speakers of a particular dialect may pronounce certain words and/or phrases a specific way that is particular to that dialect. As such, a user associated with one dialect may pronounce certain words and/or phrases a different way than a user associated with another dialect. Other audible characteristics that may be identified to aid in the determination or learning of a speaker's dialect include the speed at which the user provides voice input, the volume at which they provide voice input, an accent associated with their voice input, and any other characteristic of the voice that can be used to distinguish between two or more dialects.

In an embodiment, another characteristic associated with the voice input may comprise specific words and/or phrases that are particular to a specific regional dialect. For example, a submarine sandwich (i.e., a long sandwich containing cold cuts, lettuce, etc.) may be referred to as a variety of different things depending on the region an individual is in. Perhaps the most ubiquitous name for the submarine sandwich is a "sub". However, to individuals residing in New York City, the submarine sandwich is commonly referred to as a "Grinder"; for individuals residing in Philadelphia, a "Hoagie"; and for individuals residing in New Orleans, a "Poor Boy". Therefore, responsive to receiving the audible user input "Which restaurant serves the best hoagie in town?" an embodiment may determine that the user input is associated with an Eastern Pennsylvanian dialect.

By identifying characteristics associated with the received voice data, an embodiment may identify a corresponding dialect to provide output in (e.g., by comparing the identified characteristics to a database of characteristics matched to particular dialects, etc.). Additionally and/or alternatively, an embodiment may learn the intricacies of a user's personal dialect (e.g., through frequent interaction with the user, etc.) and store the learned characteristics in a user profile. In an embodiment, a device may store (e.g., at a storage location integral to the device or at a remote storage location accessible by the device, etc.) one or more user profiles. Each user profile may be associated with an individual user. In an embodiment, multiple users may access and use a single device. In such a situation, an embodiment may identify a user prior to accessing a user profile associated with that particular user. For example, multiple users may have the ability to access a device (e.g., a smart phone, a dedicated smart speaker, a laptop computer, a desktop computer, etc.) by logging into a user profile.

Each user profile may contain a variety of settings, including dialect data, which may be specific to the identified user. For example, User A may gain access to a user profile on a device by providing user identification data (e.g., an audible trigger word, a digital fingerprint, user-associated passcode, user credentials, biometric data, device data, etc.) to an input device associated with the device. Subsequent to granting User A access to their user profile, an embodiment may have access to dialect data associated with User A. If User B logs in to a user profile associated with User B on the same device, an embodiment may access dialect data specific to User B rather than the dialect data associated with User A.

Responsive to determining a dialect associated with the audible user input, at 302, an embodiment provide, at 304, output associated with the dialect. The output may be audio output, visual output, a combination thereof, or the like. In an embodiment, the audible output may be provided through a speaker, another output device, and the like. In an embodiment, the visual output may be provided through a display screen, another display device, and the like. In an embodiment, the output device may be integral to the speech recognition device or may be located on another device. In the case of the latter, the output device may be connected via a wireless or wired connection to the speech recognition device. For example, a smart phone may provide instructions to provide audible output through an operatively coupled smart speaker.

In an embodiment, the provision of the output may comprise adjusting a dialect setting associated with the device. The dialect setting may be associated with a way output is provided to a user. Adjusting the dialect setting may comprise adjusting the dialect setting from a first dialect setting (e.g., from a standard dialect setting preconfigured on the device, from a previous dialect setting associated with another user profile, etc.) to a dialect associated with the audible user input. For example, the system may adjust from the factory default setting to a dialect setting associated with the user. As another example, a user may select a preconfigured dialect, for example, American English, and as the system learns the more specific dialect of the user, the system may adjust the standard American English dialect to the one of the user. An embodiment may use the identified characteristics in the voice data to adjust output to match the dialect of the audible user input by incorporating the identified characteristics.

In an embodiment, regarding audible output, a dialect setting may correspond to output pronunciation (e.g., how a device pronounces various words and/or phrases, etc.), output speed (e.g., how quickly a device recites natural language output, etc.), output volume (e.g., how loudly a device recites natural language output, etc.), output word choice (e.g., which dialect specific words are used in the output, etc.) and the like. In an embodiment, the audible output may be provided in the same, or substantially the same, dialect as the dialect associated with the audible user input. For example, responsive to determining or learning that the user input is associated with a Western Pennsylvanian dialect, an embodiment may provide responsive audible output utilizing characteristics associated with the Western Pennsylvanian dialect (e.g., utilizing vowel and consonant sounds associated with the Western Pennsylvanian dialect, etc.) and/or utilizing words commonly used in the Western Pennsylvania dialect (e.g., "yinz", etc.).

In an embodiment, a dialect setting may correspond to the way visual output (e.g., word choices used in text-based output, etc.) is provided. The visual output may comprise words that are commonly used in a particular dialect. For example, responsive to receiving the user query input "is Fenway Park far away?" in a Boston English dialect (e.g., "is Fenway Pahk fah away?"), an embodiment may provide, on a display screen, the following text-based visual output: "yea, Fenway Park is wicked far". In this situation, the word "wicked" is a commonly used substitute for the word "very" in the Boston English dialect.

Responsive to not determining a dialect associated with the audible user input, at 302, an embodiment provide, at 303, output using preconfigured settings. In this context, preconfigured settings may refer, for example, to a preconfigured dialect setting disposed on the device.

The various embodiments described herein thus represent a technical improvement to conventional dialect related output techniques. Using the techniques described herein, an embodiment may determine a dialect associated with user-provided audible input. Thereafter, an embodiment may adjust a dialect setting to provide output using the same dialect as the user-provided input. Such techniques may allow a user to feel more comfortable interacting with a device and may promote increased device utilization.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, audible user input and user identification data identifying the user, wherein the audible user input comprises a user query;
determining, using a processor, a dialect associated with the audible user input, wherein the determining comprises identifying at least one colloquialism present in the audible user input that is associated with the dialect, wherein the determining the dialect comprises identifying, by analyzing the audible user input, one or more characteristics associated with the audible user input;
providing, on a display screen associated with the information handling device and responsive to the user query and based on the determining, text-based output using at least one other colloquialism associated with the dialect, wherein the text-based output comprises at least one word spelled in a manner known to be associated with the dialect; and
storing, in a storage medium accessible by the information handling device, the dialect in a profile associated with the user.

2. The method of claim 1, wherein the providing further comprises providing audible output, that is consistent with the text-based output, at a volume level associated with the dialect.

3. The method of claim 1, wherein the providing comprises adjusting a dialect setting associated with the information handling device.

4. The method of claim 3, wherein the adjusting comprises adjusting the dialect setting from a first dialect to the dialect associated with the audible user input.

5. The method of claim 1, wherein the providing comprises using the one or more identified characteristics to adjust output to match the dialect of the audible user input by incorporating the identified characteristics.

6. The method of claim 5, wherein the adjusting the output comprises adjusting a vowel and consonant pronunciation based upon the one or more identified characteristics.

7. The method of claim 1, wherein the determining comprises determining the audible user input using one or more of spectrogram analysis, cadence analysis, rate of speech analysis, and vocabulary term analysis.

8. The method of claim 1, further comprising accessing the profile responsive to identifying the user.

9. An information handling device, comprising:
a display screen;
a processor;
a memory device that stores instructions executable by the processor to:
receive audible user input and user identification data identifying the user, wherein the audible user input comprises a user query;
determine a dialect associated with the audible user input, wherein the determining comprises identifying at least one colloquialism present in the audible user input that is associated with the dialect, wherein to determine the dialect comprises identifying, by analyzing the audible user input, one or more characteristics associated with the audible user input;
provide, on the display screen and responsive to the user query and based on the determining, text-based output using at least one other colloquialism associated with the dialect, wherein the text-based output comprises at least one word spelled in a manner known to be associated with the dialect; and
store, in a storage medium accessible by the information handling device, the dialect in a profile associated with the user.

10. The information handling device of claim 9, wherein the instructions are further executable by the processor to provide audible output, that is consistent with the text-based output, at a volume level associated with the dialect.

11. The information handling device of claim 10, wherein the instructions executable by the processor to adjust comprise instructions executable by the processor to adjust the dialect setting from a first dialect to the dialect associated with the audible user input.

12. The information handling device of claim 9, wherein the instructions executable by the processor to provide comprise instructions executable by the processor to use the one or more identified characteristics to adjust output to match the dialect of the audible user input by incorporating the identified characteristics.

13. The information handling device of claim 12, wherein the instructions executable by the processor to adjust the output comprise instructions executable by the processor to adjust a vowel and consonant pronunciation based upon the one or more identified characteristics.

14. The information handling device of claim 9, wherein the instructions executable by the processor to determine comprise instructions executable by the processor to analyze the audible user input using one or more of spectrogram analysis, cadence analysis, rate of speech analysis, and vocabulary term analysis.

15. A product, comprising:
a storage device that stores code, the code being executable by a processor and comprising:
code that receives audible user input and user identification data identifying the user, wherein the audible user input comprises a user query;
code that determines a dialect associated with the audible user input, wherein the determining comprises identifying at least one colloquialism present in the audible user input that is associated with the dialect, wherein the code that determines the dialect comprises identifying, by analyzing the audible user input, one or more characteristics associated with the audible user input;
code that provides, based on the code that determines and responsive to the user query, text-based output using at least one other colloquialism associated with the dialect, wherein the text-based output comprises at least one word spelled in a manner known to be associated with the dialect; and
code that stores, in a storage medium accessible by the information handling device, the dialect in a profile associated with the user.

16. The method of claim 1, wherein the user profile comprises a plurality of settings specific to the user;
   wherein the plurality of settings comprises dialect data specified by the identified user.

17. The method of claim 1, wherein the analyzing the audible user input to identify one or more characteristics comprises adjusting an audible output to match the dialect of the audible user input based upon the identified one or more characteristics.

18. The information handling device of claim 9, wherein the instructions executable by the processor to store in the user profile comprises a plurality of settings specific to the user;
   wherein the plurality of settings comprises dialect data specified by the identified user.

19. The information handling device of claim 9, wherein the instructions are executable by the processor to analyze the audible user input to identify one or more characteristics comprises adjusting an audible output to match the dialect of the audible user input based upon the identified one or more characteristics.

\* \* \* \* \*